Nov. 5, 1940.  J. L. BLOOMHEART  2,220,673
VALVE FOR ABSORBERS
Filed April 20, 1939   2 Sheets-Sheet 2
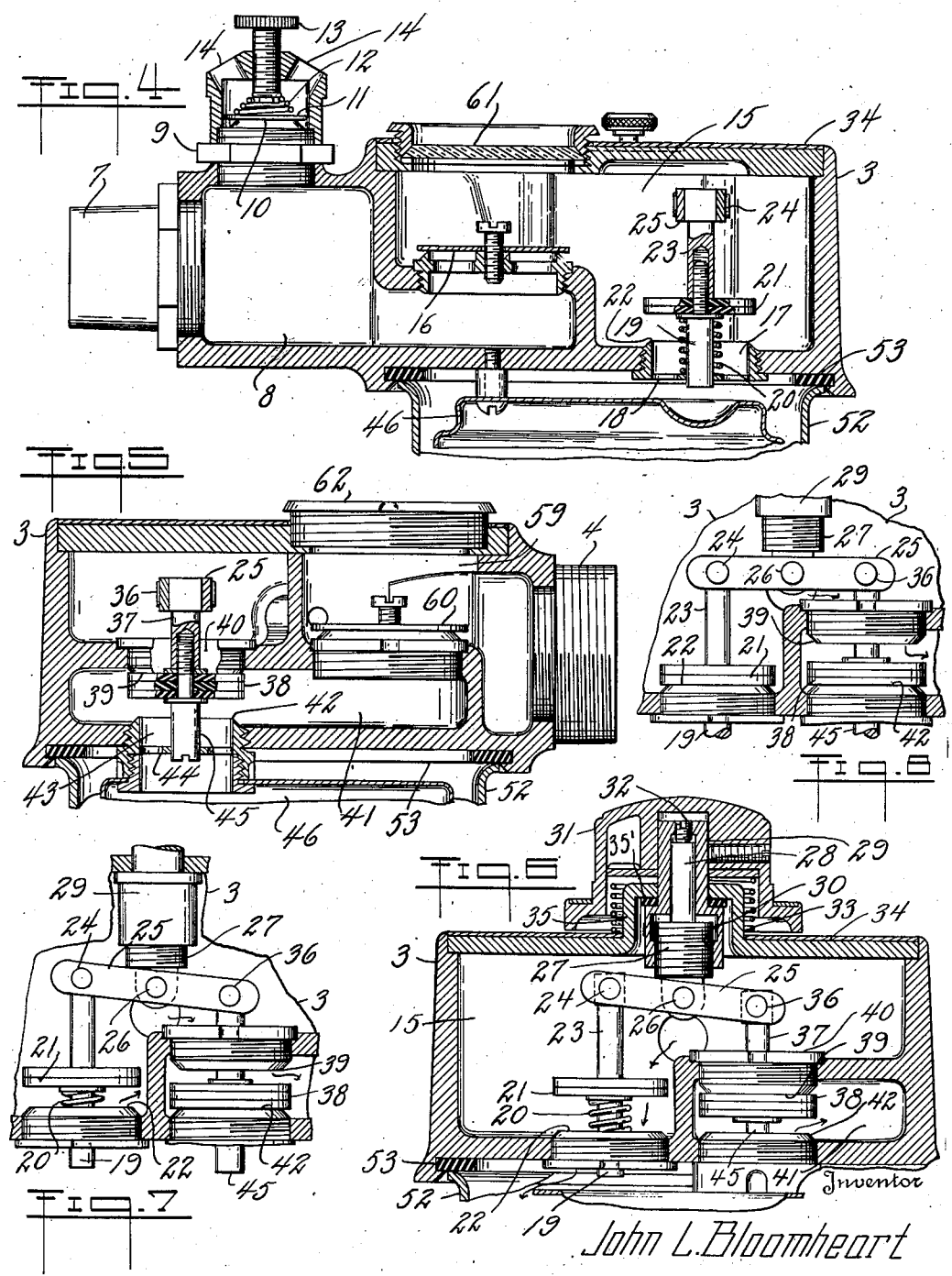
Inventor
John L. Bloomheart
By
Attorney Patented Nov. 5, 1940

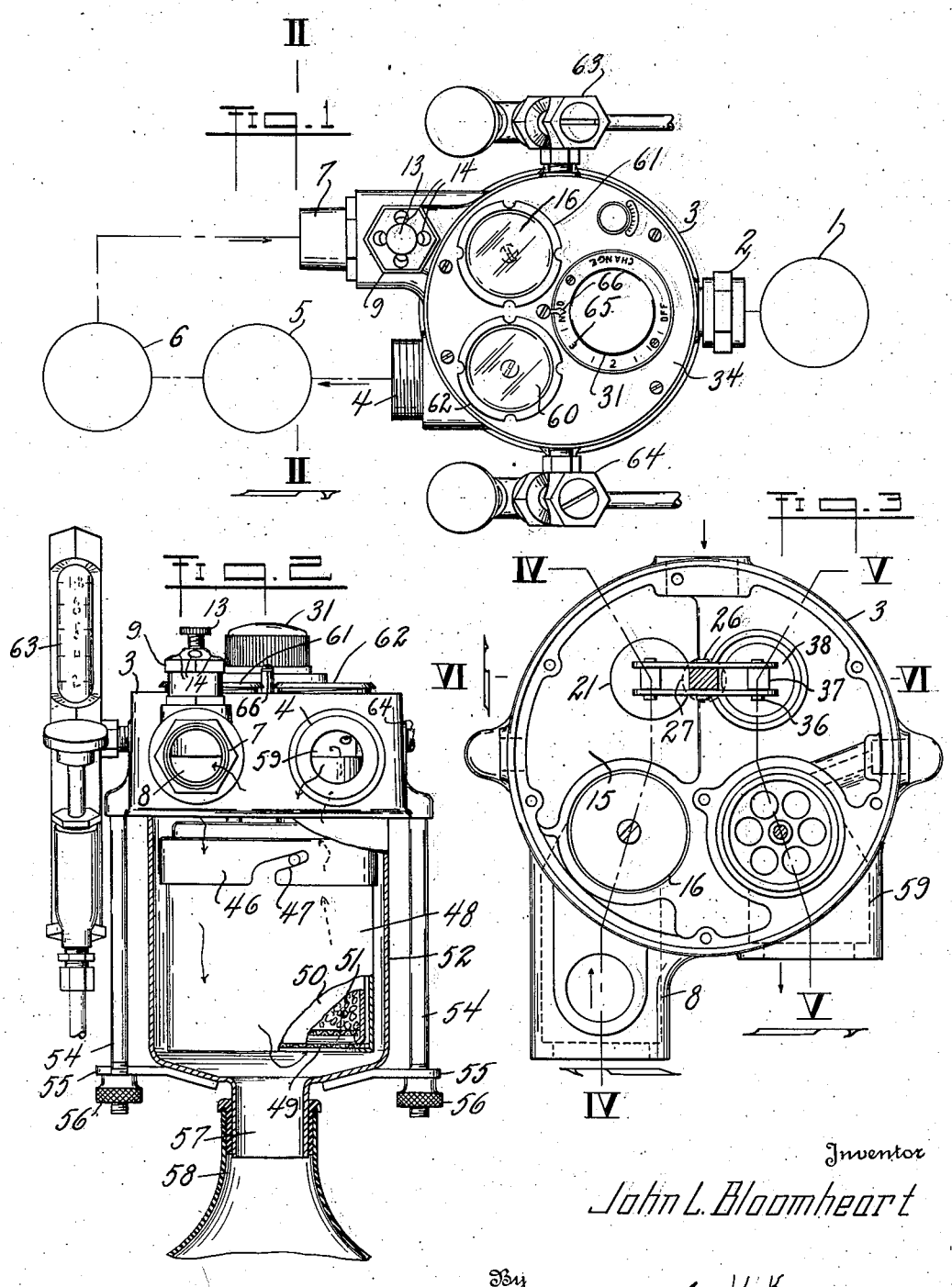

2,220,673

UNITED STATES PATENT OFFICE 2,220,673

VALVE FOR ABSORBERS

John L. Bloomheart, Toledo, Ohio, assignor to Martha F. McKesson, Toledo, Ohio

Application April 20, 1939, Serial No. 268,998

8 Claims. (Cl. 277—20)

This invention relates to multiple port control.

This invention has utility when incorporated in connection with anaesthesia, analgesia, and resuscitation type of gas administering machines, more especially for soda lime absorber of carbon dioxide constituent from exhalations of a patient, and especially as to the control valves therefor.

Referring to the drawings:

Fig. 1 is a plan view of an embodiment of the invention, diagrammatic as to its association with gas administering machine and connections therefrom to a patient;

Fig. 2 is a view on the line II—II, Fig. 1, showing the head and its association with the absorber and rebreathing bag, parts being broken away;

Fig. 3 is a plan view of the head with the cover removed and control parts partially broken away;

Fig. 4 is a section on the line IV—IV, Fig. 3, showing the return or exhalation passage to the head;

Fig. 5 is a section on the line V—V, Fig. 3, showing the inhalation passage from the head as well as the features for by-passing the absorber connected to the head;

Fig. 6 is a section on the line VI—VI, Fig. 3, showing the multiple port control device for determining the cutting in and cutting out of the absorber as to the inhalation passages, the valve closures being shown in position for placing the absorber in circuit;

Fig. 7 is a view similar to Fig. 6, with parts broken away, showing the position of the control device with the valve closures shifted to cut out direct flow into the absorber reservoir, thereby allowing major flow directly to by-pass the reservoir but permitting pressure release as to any gas in the absorber reservoir; and Fig. 8 is a view similar to Fig. 7 but with the control device for the closures further shifted to positively cut out the reservoir and precluding other than full by-passing of the reservoir.

Gas administering machine 1, say for oxygen, or oxygen, nitrous oxid, or other gas as ethylene or even carbon dioxide in controllable quantities, is connected by duct to fitting 2 at head 3. From this head 3 at fitting 4 connection may be had to vaporizer 5, in the event such precaution be in order. This connection is such as may be left out or by-passed for direct connection to mask 6 having exhalation way therefrom to fitting 7 (Fig. 4) back to the head 3 and entering such head by exhalation passage 8. This passage 8 is provided with fitting 9 having therein seat 10 which may be closed by relief valve disk 11 having yieldable actuation by spring 12 as controlled by screw 13 so that spill of gas from the chamber 8 may be by way of ports 14 as manually controlled. This exhalation passage 8 into the head 3 has exhalation chamber section 15 with gravity seated check valve disk 16 insuring one way or exhalation flow from the passage portion 8 to the passage portion 15.

From the passage portion 15 there is port 17 having spider 18 as a guide for stem 19 and a seat for compression helical spring 20 about said stem normally yieldably thrusting closure 21 away from seat 22 about the port 17. This stem 19 has portion 23 upwardly from the closure 21 with pivot pin connection 24 (Fig. 6) to walking beam or rocker 25 having central fulcrum pin 26 on ear from screw thread portion 27 having stem 28 therefrom in sleeve 29 having complementary threaded portion 30 coacting with the thread portion 27. This sleeve 29 is set screw anchored with cap or head 31. Set screw 32 determines the limit of travel for this stem 28 in the sleeve 29. This cap 31 is yieldably held by compression helical spring 33 as to closure plate 34 for the head 3. This sleeve 29 protrudes through central boss 35 of this plate 34 at gasket 35' limits the upward position for this nut or internally threaded portion 30 as rotatable with the cap 31 relatively to the threaded portion 27 in effecting longitudinal or axial shifting of this portion 27 and therewith of the walking beam or lever 25.

The opposite end of this lever 25 from that having the pivot pin 24 has pivot pin 36 to stem 37 carrying closure 38. The closure 21 has compressible disk on the single side toward the seat 22. This closure 38 has compressible disk portions on the upper side toward seat 39 at port 40 into the chamber or passage 15 isolated by a partition in the head from passage 41 for communication with the fitting 4. This closure or disk 38 on the opposite side toward the seat 39 may have the compressible port thereat engage seat 42 at port 43. In this port 43 is guide spider 44 (Fig. 5) for stem portion 45 fixed with this closure disk 38.

This port 43 has anchored therewith cap 46 having bayonet joint connection 47 (Fig. 2) with shell 48 having perforate bottom 49. In this container, provided by the cap 46 and shell 48, is carton reservoir screen ended container 50 having a charge of responsive material hereunder, say soda lime 51, for effecting removal of carbon dioxide from exhalation gas as flowing through the port 17 (Fig. 4) about the outside of the cap 46 and within receptacle or vessel 52 anchored concentrically with the head 3 and sealed therewith by gasket 53 (Fig. 4). This assembly into sealing position is effected by bolts 54 (Fig. 2) from the head 3 and through ears 55 engaged by nuts 56. This chamber or receptacle 52 has lower fitting 57 to which may be connected auxiliary receptacle or chamber 58 as a rebreathing bag. Accordingly, the exhalation gas, flowing by way of the port 17 and between the reservoirs 48 and 52, may be to this rebreathing bag 58. Upon inhalation this gas of exhalation may not return through the passage 8 because the check valve 16 is seated automatically. However, the inhalation effective at the fitting 4 and passage 59 (Fig. 5) unseats gravity check valve disk 60 for opening communication with the chamber 41 and inducing flow thereto from the port 43 and thereby effects a draft upward through the soda lime 51 in the container 50. This means the inhalation is effective through the foraminous bottom or openings 49 of the vessel 48 and the gas from exhalation is thus cleared of carbon dioxide at the inhalation draft thereof toward the passage 59.

Window fitting 61 (Fig. 4) discloses the functioning of the exhalation check valve disk 16. Window device 62 (Fig. 5) shows the functioning of the inhalation check valve disk 60. The addition or flow rate of oxygen, nitrous oxide or such other gas or gases not from the machine 1 or in a different proportion or independently controlled, is disclosed by device 63 (Figs. 1, 2) at one side and by similar device 64 on the opposite side of the head 3. The cap 31 carries graduation marking notation 65, which as having transit in relation to pointer 66, determines the conditions for "off" by-passing or cutting out "changing" to "on," fully cutting in the absorber as well as transit conditions partially therebetween. At the fully cut-out position for by-passing, it is then appropriate to replace the soda lime container independently of shutting off the functioning of the gas administering machine with the patient.

There is accordingly herein provided a manual control for direct seating valves, one lagging as to the other in thrusting directly toward and from the seat or closure. This means that gas attack may be minimized in affecting the close functioning hereunder and the accuracy of control at all times.

What is claimed and it is desired to secure by United States Letters Patent is:

1. A valve body having a top, bottom and intermediate sides, seat means for the body at the bottom for assembly of a pair of reservoirs therewith, a partition forming passages in the body parallel to and spaced from the bottom, there being two ports through the partition and two ports through the bottom, one of the ports of the partition being in opposing relation to one of the ports of the bottom, an actuator on the exterior of the head at the top, and a connection from the actuator providing two valve disks for three of said ports, one of said disks being shiftable by the actuator and connection relatively to the opposing ports.

2. A valve body having a top, bottom and intermediate sides, seat means for the body at the bottom for assembly of a pair of reservoirs therewith, a partition forming passages in the body parallel to and spaced from the bottom, there being two ports through the partition and two ports through the bottom, one of the ports of the partition being in opposing relation to one of the ports of the bottom, an actuator on the exterior of the head at the top, and a linkage connection from the actuator providing two valve disks for three of said ports, one of said disks being shiftable by the actuator and connection relatively to the opposing ports.

3. In combination, a valve body for connection to a pair of reservoirs, said body having a top, bottom and intermediate sides, two ports through the sides and two ports through the bottom, said latter ports being to the respective reservoirs, a partition forming passages in the body having three ports, check valves in the passages opening to said side ports, a valve for the third port, and an actuator for the latter valve.

4. In combination, a valve body for connection to a pair of reservoirs, said body having a top, bottom and intermediate sides, two ports through the sides and two ports through the bottom, said latter ports being to the respective reservoirs, a partition forming passages in the body having three ports, two check valves, one thereof opening to permit inward flow through the partition to the bottom of the body and the other to permit outward flow through the partition from the bottom of the body, an additional multiple valve device for the third partition port and the two bottom ports, and an actuator for the device.

5. In combination, a valve body for connection to a pair of reservoirs, said body having a top, bottom and intermediate sides, two ports through the sides and two ports through the bottom, said latter ports being to the respective reservoirs, a partition forming passages in the body having three ports, two check valves, one thereof opening to permit inward flow through the partition to the bottom of the body and the other to permit outward flow through the partition from the bottom of the body, said third port of the partition and one of the bottom ports being in opposing relation, an additional multiple valve device for the opposing ports and the other bottom port, and an actuator for the device.

6. In combination, a valve body for connection to a pair of reservoirs, said body having a top, bottom and intermediate sides, two ports through the sides and two ports through the bottom, said latter ports being to the respective reservoirs, a partition forming passages in the body having three ports, check valves in the passages opening to said side ports, said third port of the partition and one of the bottom ports being in opposing relation, an additional multiple valve device for the opposing ports and the other bottom port, a manually operable element exterior of the body, a pair of parallel valve stems in the body for the device as to the three ports, and linkage connection means from the valve stems to the element.

7. In combination, a valve body for connection to a pair of reservoirs, said body having a top, bottom and intermediate sides, two ports through the sides and two ports through the bottom, said latter ports being to the respective reservoirs, a partition forming passages in the body having three ports, two check valves, one thereof opening to permit inward flow through the partition to the bottom of the body and the other to permit outward flow through the partition from the bottom of the body, said third port of the partition and one of the bottom ports being in opposing relation, an additional multiple valve device for the opposing ports and the other bottom port, a manually operable element exterior of the body, a pair of parallel valve stems in the body for the device as to the three ports, and a link between the valve stems adapted to be shifted by the element.

8. In combination, a valve body for connection to a pair of reservoirs, said body having a top, bottom and intermediate sides, two ports through the sides and two ports through the bottom, said latter ports being to the respective reservoirs, a partition forming passages in the body having three ports, check valves in the passages opening to said side ports, said third port of the partition and one of the bottom ports being in opposing relation, an additional multiple valve device for the opposing ports and the other bottom port, a manually operable element exterior of the body, a pair of parallel valve stems in the body for the device as to the three ports, one of the valves of the device being yieldably connected to a stem, and a link between the stems and connected therefrom to be controlled by the element.

JOHN L. BLOOMHEART.